S. C. SALISBURY.
Hot-Air Furnace.
No. 93,351.            Patented Aug. 3, 1869.
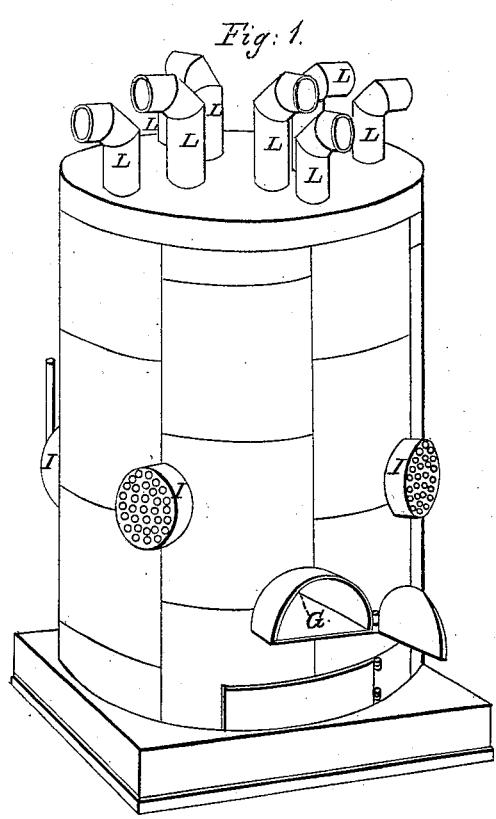
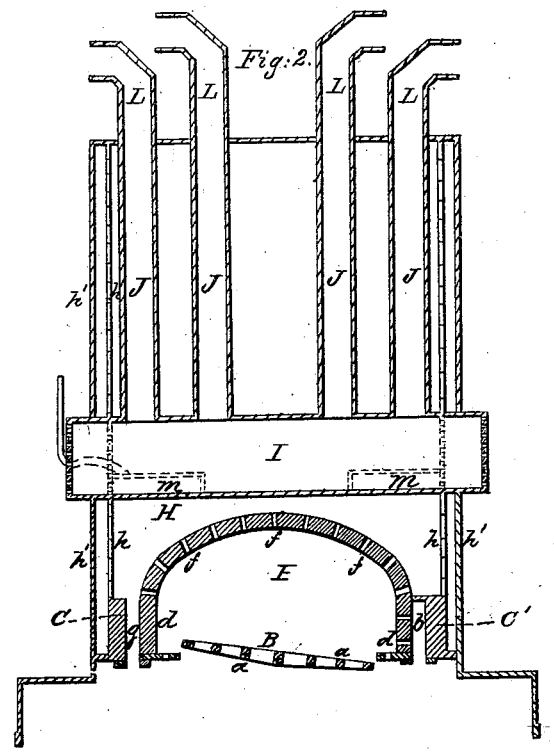
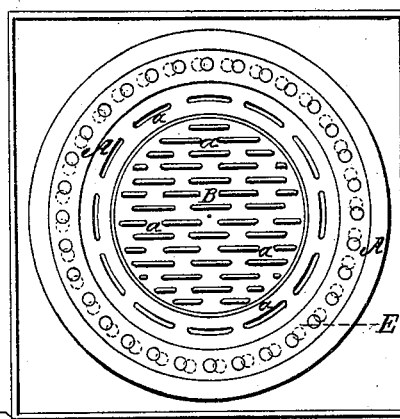
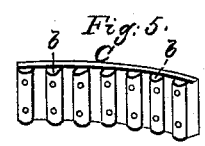
Witnesses.
Inventor.
Silas C. Salisbury.

United States Patent Office.

SILAS C. SALISBURY, OF NEW YORK, N. Y.

Letters Patent No. 93,351, dated August 3, 1869.

IMPROVEMENT IN HOT-AIR FURNACES.

The Schedule referred to in these Letters Patent and making part of the same.

*To all whom it may concern:*

Be it known that I, SILAS C. SALISBURY, of the city of New York, in the county of New York, and State of New York, have invented certain new and useful Improvements in Apparatus for Warming Dwellings and other Buildings; and I do hereby declare that the following is a full, clear, and exact description thereof, and of their mode or manner of operation, reference being had to the accompanying drawings, and to the letters of reference marked thereon, and making a part of this specification.

Furnaces for heating dwellings are generally constructed of iron, the fire-chamber sometimes lined with brick, but more commonly without any lining, and are either surrounded with brick-work, forming an air-chamber around the furnace, the air in which is heated by coming in direct contact with the hot iron surface of the furnace, and from which chamber the air so heated is taken and conveyed to different parts of the building to be heated, or the fire-chamber, either lined with bricks or unlined, is surrounded by an iron cylinder or casing, between which and the fire-chamber air is admitted, and where it is heated, as in the case first mentioned by direct contact with the hot iron surface, and is then conveyed where desired.

The natural and necessary result of such modes of heating the air is that the oxygen of the air is more or less burned up, and the air is thus deprived, to a great degree, of its life-supporting element, and thereby becomes, in fact, an unhealthy and hurtful compound, more or less injurious, according as its oxygen has been more or less burned up or destroyed by contact with the heated iron of the furnace; and the breathing of such air, so vitiated or deprived of its health-giving element, is very injurious, and, if long continued, lays the foundation for many diseases of a fatal character.

In such furnaces also, there being but a single reservoir or chamber of heated air from which the hot air is to be taken and distributed to different parts of the house, it is often very difficult, if not impossible, by reason of the varying draught in different parts of a house, produced by different currents of the atmosphere, to heat all parts of the house uniformly, as the heated air of the whole chamber will naturally flow in the direction in which is the greatest draught.

Such furnaces also generally burn out very rapidly, so that the continual repairs greatly increase their cost and expense.

My invention has for its object the remedying or removing these imperfections or objections; and by its construction, the air is heated without its oxygen being destroyed or injured, separate chambers being arranged for the several and separate distributing-pipes, and the furnace is both very compact and durable, and not likely to get out of repair.

Figure 1 is a perspective view of a complete heater, showing the pipes for taking in the cold and distributing the hot air.

Figure 2 is a vertical section of fig. 1.

Figure 3 is a bottom view of the grate and fire-chamber.

Figure 4 is a detached section of the inside lining of the fire-chamber and of the arch.

Figure 5 is a detached section of the outside fire-lining.

The base-plate A and grate B are made of cast-iron, the latter formed with numerous separate openings $a$ for taking in air, substantially as shown in fig. 3, so that the air will be supplied to the under side of the fire in separate divided currents, and to all parts substantially alike.

For the purpose of receiving and supporting the outer and inner walls or linings of the furnace, I prefer to cast or form the base-plate with two annular concentric recesses, which may be either sunken or have flanged edges, and which are separate from each other a little distance, about half an inch to an inch, in which space is a series of holes for the free admission of air, for the purposes hereafter mentioned.

Resting in the outer recess referred to, and extending entirely around the fire-chamber, and projecting upwards about as far as the perpendicular sides of the fire-chamber, is a cast-iron plate, C, from half an inch to an inch in thickness, on the inner sides of which, or made a part of it, and placed at suitable intervals, say every two inches, is a series of pipes or half-round tubes, $b$, which are open at the bottom to freely take in air, and closed at the top to prevent the air passing through them, but having along their inner sides a series of vertical holes, $c$, to allow the air to pass out horizontally.

A section of one of such tubes is shown in fig. 2, and a detached portion of the cast-plate C and its tube $b$, in fig. 5.

Within such cast-iron plate, and in contact with the inner sides of the tubes $b$, and resting in the inner recess before mentioned of the base-plate, is placed a ring of fire-brick, D, which also extends entirely around, and forms the inside wall of the fire-chamber E, and through which are also made perforations $d$, corresponding in position with the holes $c$ in the tubes $b$.

By means of such arrangement of air-tubes $b$, perforated as described, and the perforated fire-brick D, air is constantly supplied to the fire-chamber E in divided jets on every side of the burning fuel, and at the top thereof, and at different places below.

Large quantities of air are thereby not only continually supplied to such chamber, but it is presented to and distributed through every part of the burning mass, and as such air becomes highly heated before it reaches the fire-chamber, by passing through the tubes $b$ and the perforated fire-brick, such chamber is, in fact, continually supplied with a hot blast; and to assist in so heating the air, the tubes $b$ may be filled with fine gauze asbestos cloth, which can be kept constantly very hot, without being destroyed.

By thus supplying the fire-chamber on every side, and on top of and at different points in the burning fuel with jets of heated air, the decarbonization of the fuel commences, or is carried on from the top and from the outside, instead of from the bottom and centre, as usual, and an intense heat is produced, while the combustion is slower; and the combustion being most actively carried on at the top and sides of the fuel, the grate-bars remain comparatively cool, and are thereby made more durable.

The inside surface of the fire-clay ring D should be fluted, as shown in fig. 4, so as to prevent the fuel closely packing against the brick, and interfering with proper distribution of the air.

The quantity of air admitted to the chamber E may be regulated and controlled by a sliding plate, F, by which the mouths of the tubes $b$ may be more or less contracted and closed.

Such fire-chamber E is wholly arched over with fire-brick, as shown in fig. 2, in section, (a suitable opening, G, being made therein to allow the feeding the furnace,) through which arch numerous perforations $f$, generally about half an inch in diameter, are made, to allow the carbonic oxides, and products of combustion generated therein, to pass into the outer or combustion-chamber H, which is also supplied with air from below, through the spaces or openings $g$, which are between the iron plate C, the fire-brick D, and the air-tubes $b$, and in passing through which spaces the air becomes highly heated.

A section of one of such openings $g$ is shown in fig. 2.

The air supplied to the combustion-chamber H, becoming highly heated while passing thereto, is rendered lighter than the carbonic oxides continually entering from the fire-chamber E, and an intimate mixture or union of the air and gases takes place, utilizing the whole, and producing their complete and perfect combustion.

Enclosing or forming the walls of the combustion-chamber H is a series of fire-clay rings, $h$, which rest upon or have their foundation near or just outside of the cast plate C, and which extend to the top of the heater, thus forming an internal chamber, the sides of which are of fire-brick, and not liable to be burned out for a great length of time.

An outer wall, $h'$, of fire-clay rings or iron plates, and placed three or four inches from the inner wall $h$, forms the outside of the heater.

This air-chamber between such two walls prevents any loss or escape of heat from the furnace, and keeps the outside of the heater cool, or furnishes a convenient channel for admitting air to the furnace to be heated, as hereafter described.

In this chamber H, and over the arch of the fire-chamber E, I insert clay pipes I I, passing through the chamber H at right angles, and through the enclosing walls $h$ and $h'$, the outer ends of which are covered with wire gauze, to freely admit air, but exclude dirt and dust.

Such pipes are perforated, and fitted with flanges on their upper sides and within the chamber H, to receive or take other clay pipes J J, which are vertical, and pass up to the top of the furnace, and there each connect with tin, or other suitable pipes L, to conduct the heated air to the several apartments of the dwelling.

To increase the effective action of the pipes I I, they may be filled with asbestos, so that the air passing through them will be more effectually heated before its distribution.

In each of such pipes there should also be placed or fixed a pan or vessel, $m$, for containing water, and by the evaporation of which, the air being heated is properly moistened.

Such pan or vessel should be kept continually supplied with water, which may be admitted through the pipe $k$.

In the arrangement of the heating-air pipes I I, above described, the ends of such pipes project beyond the outer wall $h'$, and receive their air from without the heater.

A preferable construction is to have such pipes only extend through the inner or fire-brick enclosing-wall $h$, (the outer wall $h'$ being unbroken or continuous,) and admit the air into the space between the walls $h$ $h'$ from above, and in this manner supply the pipes I I with air for heating and distribution.

Such arrangement is shown in fig. 2 by dotted lines.

By placing the vertical hot-air pipes J J inside of the furnace, I am enabled to further economize the means of heating from the radiation of the fire-clay, and I am also enabled to supply each register with a separate and distinct supply of hot air; such heated air also, instead of being heated by contact with iron, and thereby deprived of its oxygen is heated without having its life-sustaining element burned up or destroyed, and by means of the water-vessels described, can be charged with moisture to any degree desired.

Such construction and arrangement of furnace fully remedies or overcomes the defects so much complained of in ordinary furnaces. The air is not rendered unhealthy or injured while being heated. The expense of brick-work to form a hot-air chamber is rendered unnecessary, and different rooms can be more certainly and uniformly heated.

What I claim as my invention, and desire to secure by Letters Patent, is—

1. The application and use, in combination with suitable air-chambers and pipes for heating air for dwellings, &c., of a heating-furnace, consisting of an inner fire or preparation-chamber, and an outer or combustion-chamber, constructed and arranged substantially as described, whereby atmospheric air can be applied to both such chambers, and be heated in passing thereto, such inner chamber being also covered by or separated from the outer one by a perforated arch or top, and such chambers being arranged, with respect to each other, substantially as and for the purposes set forth.

2. Forming the pipes or chamber that receives the air, and in which it is heated, of fire-clay, and in combination with such pipes or chamber, the use of asbestos cloth or fibre within the same, for the purposes mentioned.

3. An apparatus for heating air for warming dwellings, &c., constructed, arranged, and operating substantially as described.

SILAS O. SALISBURY.

Witnesses:
S. D. LAW,
FRED. B. SEARS.